Nov. 13, 1962 F. McCALL ET AL 3,063,227
SIDE DELIVERY RAKE
Filed Jan. 3, 1956 2 Sheets-Sheet 2
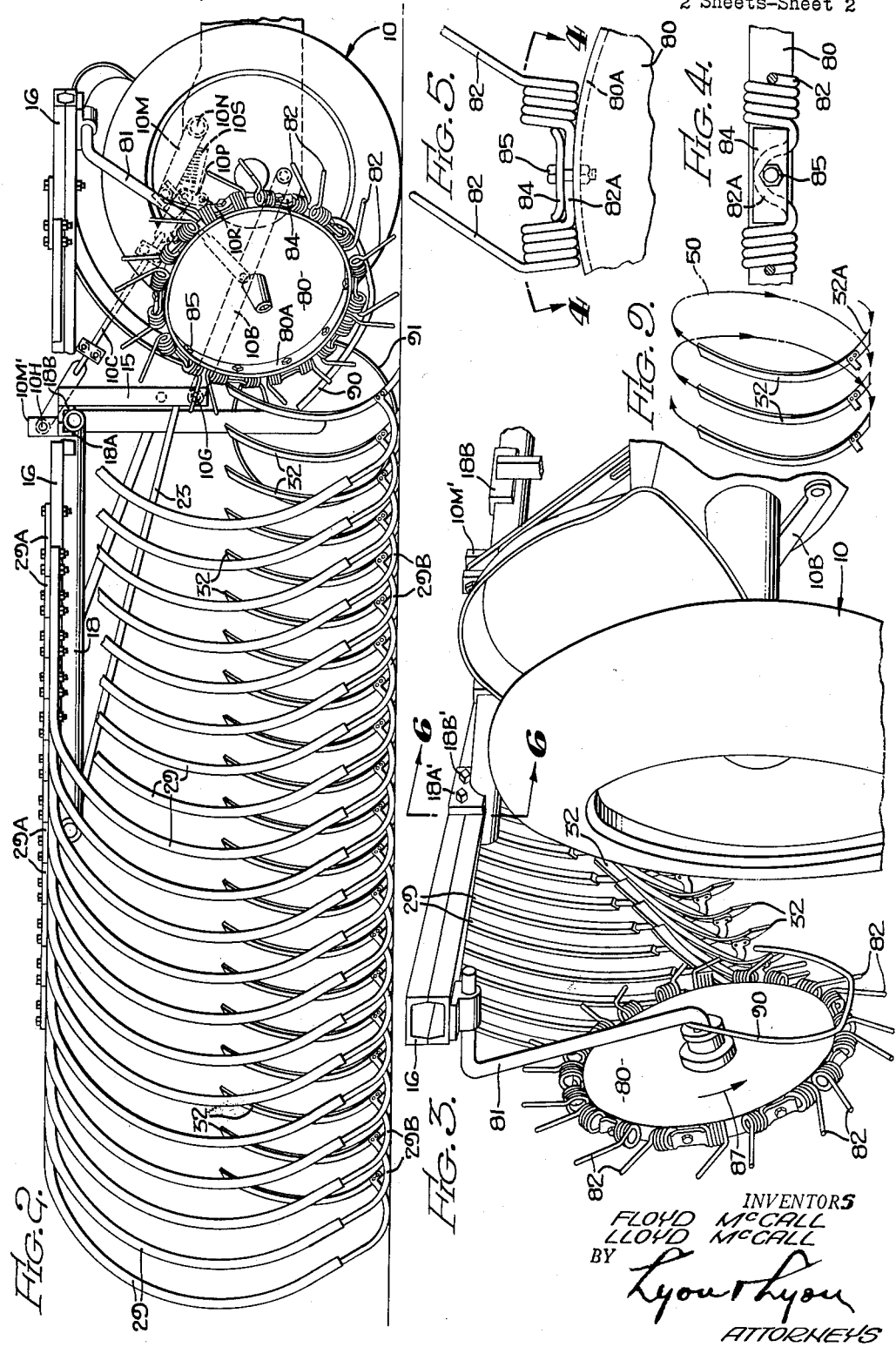
INVENTORS
FLOYD McCALL
LLOYD McCALL
BY
Lyon & Lyon
ATTORNEYS United States Patent Office 3,063,227
Patented Nov. 13, 1962

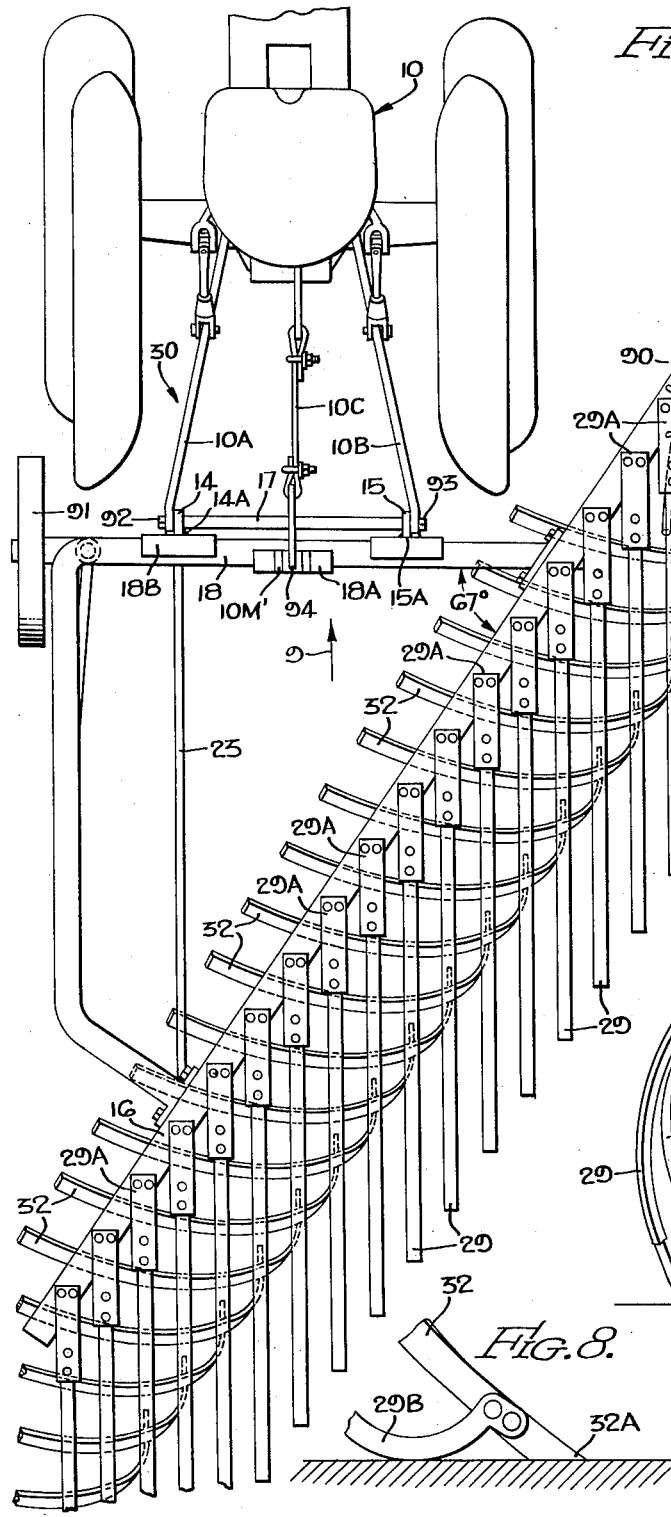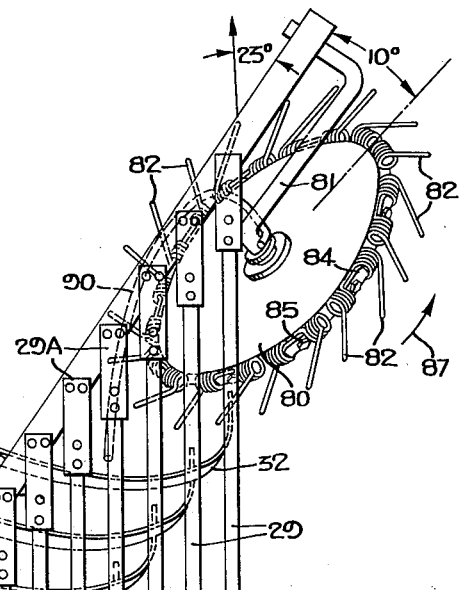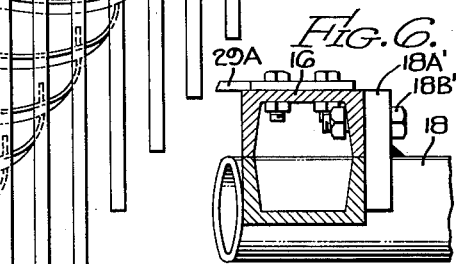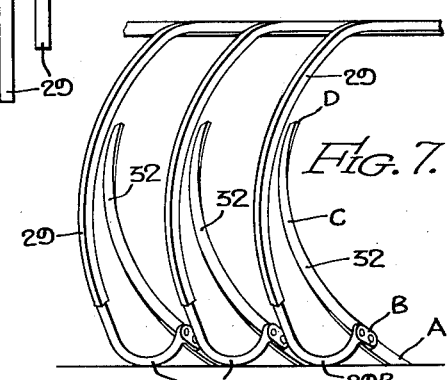

3,063,227
SIDE DELIVERY RAKE
Floyd McCall, Rte. 1, Box 188, and Lloyd McCall,
Rte. 1, Box 187, both of Romoland, Calif.
Filed Jan. 3, 1956, Ser. No. 556,862
18 Claims. (Cl. 56—376)

The present invention relates to improvements in rakes for gathering or collecting hay and the like and constitutes an improvement in that type of rake described and claimed in our co-pending application, Serial No. 381,377, filed September 21, 1953, and now United States Patent No. 2,744,377.

It is desirable to provide a device or machine of this character which forms the gathered hay into loose stacks through which air is allowed to circulate during the period while such stacks remain in the field, to thereby obtain a better grade of hay.

The present invention contemplates the production of harvested hay in the form of loose tubes or rolls, such tubes or rolls being produced by causing the hay to travel in a spiral when and as it is being gathered by the machine, using an arrangement similar to that illustrated in the above-mentioned patent but with improvements therein. Thees improvements result in simplification of the tine supporting structure, and also resides in the provision of positive means for preventing the hay from wrapping around the first tine. Also, the tine supporting structure is improved so that the point of the tine is positively prevented from digging too far into the ground.

It is, therefore, an object of the present invention to provide an improved machine of this character having the improvements outlined above.

Another object of the present invention is to provide an improved machine of this character having positive means for preventing entanglement of the hay around the first tine.

Another object of the present invention is to provide an improved machine of this character which incorporates a novel resilient mounting for the tines which avoids the necessity of coil type springs.

Another object of the present invention is to provide an improved machine of this character incorporating improved rake bar construction so as to more positively prevent the points of the tine from digging too deeply into the ground.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

FIGURE 1 is a top plan view of an improved rake embodying features of the present invention mounted in a novel manner on a tractor, also in accordance with features of the present invention;

FIGURE 2 is a side elevational view of the assembly shown in FIGURE 1;

FIGURE 3 is a perspective view, illustrating in more detail, of the mounting of the self-propelled hay feeding wheel;

FIGURE 4 is a view taken in the direction indicated by the arrows 4—4 in FIGURE 5;

FIGURE 5 is an elevational view of one of the resilient elements mounted on the wheel, as shown in FIGURE 3;

FIGURE 6 is a sectional view taken generally in the direction indicated by the arrows 6—6 in FIGURE 3;

FIGURE 7 is a perspective view illustrating in greater detail the structure of the tine supporting rake bars;

FIGURE 8 shows, in enlarged form, a portion of the structure illustrated in FIGURE 7; and FIGURE 9 serves to illustrate the constant curvature of the tines which lie generally on a spiral extending in echelon in the direction of movement of the vehicle.

The device or machine shown in FIGURE 1 is intended to be drawn in the direction indicated by the arrow 9 by a powered vehicle such as a tractor 10 having a three point suspension 30, such three point suspension comprising the lower arms 10A and 10B and the upper movable arm 10C. This suspension is referred to as a three point suspension, since the rake is attached to the same at three points, namely at the ends of the three arms 10A, 10B and 10C.

The machine or device is pivoted on the tractor arms 10A and 10B using pivot pins, as exemplified by the pivot pin 10G in FIGURE 2. The upper end of arm 10C is likewise pin connected to a portion of the machine, using for that purpose the pin 10H indicated in FIGURE 2.

The tractor 10, it is understood, includes conventional means whereby the free end of the arm 10C may be raised or lowered to correspondingly raise or lower the device or machine attached thereto. Such means may comprise a hydraulically operated arm 10M which rotates about the axis of the pin 10N. The outer end of the arm 10M is pin connected to the arm 10P which is pivoted about the stationary pivot pin 10R. The lower end of arm 10C is pin connected to an intermediate portion of the arm 10P. The spring 10S, a buffer spring, has one end abutting a stationary abutment and the other end engaging an intermediate portion of the arm 10P so as to provide resiliency in the suspension.

The frame of the rake includes a pair of vertically extending frame members 14 and 15 which have their lower ends interconnected by the horizontal frame member 17, such frame member having its opposite ends welded to the upstanding frame members 14 and 15. The upper ends of the frame members 14 and 15 have welded thereto at 14A and 15A, respectively, the elongated bent horizontal frame member 18 (which appears generally L-shaped in FIGURE 1), such frame member 18 being connected to the upper ends of the frame members 14 and 15 by a welded assembly including angle iron members, exemplified by the angle iron members 18A and 18B (FIGURE 2). The frame member 18 is shown in the drawings as being of round tubular stock, but the same may be of square tubular stock, and in such case the angle iron pieces 18A and 18B are not required, the arms 14 and 15 being in such case welded directly to the frame 18 and also the member 10M' supporting the pivot pin 10H, also welded directly to the frame 18.

It is noted that the frame member 18 has a portion, as shown in FIGURE 1, extending generally transversely and a portion which extends generally longitudinally.

An echelon extending support beam 16 of square or channel stock is secured to the frame 18 at opposite ends thereof, using the construction shown in FIGURE 6. Such construction involves a plate 18A' welded to the support 18 and a machine bolt 18B' passing through apertured portions of the plate 18A' and the support beam 16. The support beam 16 may be braced by providing a brace 23 (FIGURE 2), having one of its ends welded to the member 15 and the other one of its ends welded to the support 18.

It is noted that by providing the L-shaped frame 18 with the end secured thereto directly to the beam 16, a simplified construction results in comparison to the supporting structure illustrated in the above-mentioned patent.

It is clear from the structure thus far described that the frame, including the echelon support beam 16, is pivotally secured on the tractor arms 10A and 10B and may be pivoted about the axis of pin 10G upon movement of the tractor arm 10C. No supporting wheels are required for the frame other than, of course, the wheels of the tractor itself.

The rake assembly which is considered to include the support beam 16, as shown in FIGURE 1, extends in echelon with respect to the direction 9.

Each of the rake elements comprises a rake bar 29 supported in a novel manner on the support beam 16 so as to avoid a pivotal mounting and the use of coil springs. For this purpose, the upper ends of each of the rake bars 29 are bolted or riveted to one end of a corresponding resilient plate 29A, the other ends of each of the resilient plates 29A being bolted or riveted to the support beam 16. These plates 29A provide substantially all of the required resiliency in the tine supporting structure and serve to absorb shock forces exerted on the tines or the upper ends of the rake bars.

The tines 32 are connected to the outer end of the curved rake bar portion 29B by bolts or rivets. The tines 32 are of sheet stock material bent, however, as indicated in FIGURE 8 so as to provide a flat clamping surface with the flat enlarged end of the rake bar portion 29B.

Each of the tines or rake teeth 32 has a compound curvature. It is understood that the term "compound curvature," as used herein in characterizing the structural features of the rake teeth or tines, is intended to mean a tine or rake which has a curvature extended not only in the direction of movement of the vehicle upon which it is mounted but also has curvature in a direction transverse or lateral to such direction or movement. The tines or rake teeth having such compound curvature each lies generally on a spiral extending in echelon with respect to the forward movement of the vehicle upon which such tines or rake teeth are mounted, as described more fully in the previously mentioned patent as well as in our United States Patent No. 2,667,730.

It is thus observed that the tines 32 are supported near their lower ends as a cantilever on the curved portion 29B of the rake bars 29; and, in turn, the rake bars 29 are supported as a cantilever or arm for movement generally about the axis of the support beam 16. The lower ends of the tines 32 are maintained and adjusted a predetermined distance above the ground by conventional mechanism on the tractor serving to control the position of the front end of arm 10C. It is noted that the drawings illustrate the arm 10C as a chain or steel cable having its ends adapted for attachment as previously described so that under certain circumstances the rake assembly does not tend to be pushed into the ground by the tractor travelling over uneven terrain. This result would ensue since a chain or steel cable does not transmit compressive forces.

Focusing attention to the specific construction of the tines 32 in relationship to FIGURES 1, 2, 3, 7 and 8, it is observed that the lower ends of the tines of sheet stock material are cut to provide an acute angled point 32A so that a pointed structure initially engages the hay lying on the ground. As seen in FIGURE 7, the amount of curvature in the range A, B is relatively small, such curvature increasing slightly in the range B to C and then such curvature decreasing in the range C to D, such curvature being in the direction of the movement of the vehicle. It is observed further that the tines 32 are each curved in a direction transverse or lateral to such direction of movement as shown in FIGURE 1. Such curvature along such mutually perpendicular axes is referred to herein as a compound curvature, as defined hereinabove. The drawings show an equal spacing between adjacent tines 32; and while such structure is preferred, it is understood that it is within the province of the present invention to make such spacing non-uniform while maintaining the compound curvature in each one of the tines. In this respect, it may be desirable to provide each one of such tines 32 with a different degree of compound curvature, such that all the tines lie generally on a continuous spral, such as the spiral 50 in FIGURE 9.

By providing the tines with compound curvature and exposing them in echelon, a lowering movement is imparted to the gathered hay, so that the hay in its echelon movement, while thus lowering, forms itself into a roll or half tube. The production of such roll or tube is desirable since it permits circulation of air through the hay while lying on the field to aid in drying of the hay mass.

In general, the "tightness" or diameter of the roll may be controlled by imparting different degrees of compound curvature to the individual tines. Such "tightness" is also effected to a certain extent by the distance of spiral separation of the tines 32, and, in general, the closer the spacing, the smaller the amount of curvature required in each tine. Also, assuming equal spacing as shown herein, the greater the compound curvature of the tines, the looser the resulting hay roll. The above generalities are true and are generally independent of the speed of the vehicle within, of course, the normal speed range of the vehicle.

One of the features of the present invention is the provision of the self-propelled hay feeding roller 80 having spring fingers mounted on the periphery thereof. The roller 80, as shown in FIGURE 3, is rotatably supported on the lower end of the arm 81, the upper end of the arm 81 being secured to the underside of the support beam 16. This roller 80 is in the form of a flanged disc having a flange portion 80A upon which the series of spring fingers 82 are bolted.

These spring fingers 82, as shown in FIGURES 4 and 5, are really the protruding ends of a special coil spring having an intermediate connecting portion 82A extending generally longitudinally of the axis of the coil spring and so arranged that it may be conveniently clamped between the flange 80A and the clamping plate 84 by the fastening bolt 85. These fingers 82 thus resiliently supported on the periphery of the wheel disc 80 engage the ground, and their engagement causes the disc 80 to rotate counterclockwise in the direction indicated by the arrow 87 in FIGURE 3.

It is noted with reference to FIGURE 1 that the axis of rotation of the wheel disc 80 extends generally perpendicular to the axis of the support beam 16 and that a portion of the wheel disc 80 overlies the lower end of the first tine 32, for purposes of feeding that hay which lies immediately adjacent the array of tines inwardly into such array, and, in general, to prevent such hay from becoming entangled about the first tine. The provision of such wheel disc 80 is not essential in all instances, but is preferred when the hay initially lies in an entangled mass on the field, with the entanglement due to previous windy conditions.

It is noted also that a stripper bar 90 is associated with the wheel disc 80 and its purpose is generally to strip the hay from the resilient fingers 82 when and as the disc 80 is rotating.

The stripper bar 90 comprises a rod supported on the arm 81 as a cantilever, by, for example, welding. The bar 90 extends generally downwardly and is curved to lie adjacent a portion of the periphery of the wheel disc 80 so that any hay entangled in the spring fingers 82 is stripped therefrom by the bar 90.

Another important feature of the present invention resides in the particular shape of the rake bars 29 in that the curved portions 29B which engage the ground provide a relatively large contact area with the ground so as to decrease the distance the pointed ends of the tines 32 may penetrate into the ground. In other words, the contact of the curved portions 29B of the rake bars prevents the ends of the tines 32 from digging into the ground an objectionable distance.

Preferably, the frame 18 has rotatably supported thereon a gauge wheel 91 which rolls over the ground and thus maintains such frame a predetermined distance above ground.

It is also noted that the beam extends at an angle of approximately 23 degrees with respect to the direction of movement, as indicated in FIGURE 1, and that the wheel 80 has its plane extending generally at an angle of 10 degrees with respect to the axis of the beam 16. This means that the plane of the stripper wheel makes generally an angle of 33 degrees with respect to the direction of movement. The springs on the wheel 80 contact the ground.

It is noted further that the supporting arms 10A and 10B are connected to points 92, 93 (FIGURE 1) on the rake, which points extend forwardly of the point 94, at which the lift arm 10C is attached to the rake as to obtain parallel movement of the rake proper with respect to the plane of the ground.

While the beam 16 is shown fabricated from channel iron stock, the same, if desired, may be fabricated from hollow square or rectangular stock.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a side delivery hay raking device of the character described, a supporting frame, and a plurality of individual spaced tines mounted on said frame in a line extending at an angle to the direction of movement of said device, each one of said tines having a compound curvature lying generally on a continuous spiral and having the lower extremity thereof making an acute angle with the plane of the ground and spaced immediately above the ground to rake hay which lies on the ground, a wheel rotatably supported on said frame with its axis of rotation inclined with respect to the direction of movement of said device, means rotatably supporting said wheel on said frame such that said wheel rotates in a vertically inclined plane with the lower peripheral portions of the wheel being forward of its upper peripheral portion and with the rotative axis of the wheel inclined with respect to said direction of movement, said wheel having said lower peripheral portion thereof disposed in front of and overlying the lower extremity of the leading tine to engage and crowd hay in the direction of said tines, said wheel engaging said ground so as to be self-propelled.

2. In a side delivery hay raking device of the character described, a supporting frame, and a plurality of individual spaced tines mounted on said frame in a line extending at an angle to the direction of movement of said device, each one of said tines having a compound curvature lying generally on a continuous spiral and having the lower extremity thereof making an acute angle with the plane of the ground and spaced immediately above the ground to rake hay which lies on the ground, a plurality of rake bars each supporting a corresponding tine on said frame, each rake bar having an intermediate portion thereof disposed rearwardly of the lower extremity of the corresponding tine and contacting the ground with a relatively large area to prevent the lower ends of the tines from digging into the ground.

3. An arrangement as set forth in claim 1 in which said wheel has a plurality of spring fingers mounted on the periphery thereof and resiliently engaging the ground.

4. An arrangement as set forth in claim 1 including a stripper bar mounted on said frame and having a portion thereof extending in the direction of said tines and along and in front of said lower peripheral portion of said wheel to strip hay from said wheel, said stripper bar portion extending generally parallel to said line for guiding hay in the direction of said tines and for stripping hay from the lower peripheral portion of said wheel.

5. A side delivery hay raking vehicle of the character described having a chassis, a plurality of tines each mounted on said chassis in a line extending in echelon with respect to the direction of forward movement of said vehicle, each of said tines having a compound curvature and lying generally on a continuous spiral and having the lower extremity thereof making an acute angle with the plane of the ground and spaced immediately above the ground to rake hay which lies on the ground, a beam supported on said chassis and extending generally in a direction parallel to the aforementioned line, a plurality of rake bars each having its lower end supporting a corresponding tine, and a plurality of resilient strips each having one of its ends attached to a corresponding rake bar and the other one of its ends connected directly on said beam, said resilient strips providing all of the resilience of the mounting of the tines on said beam whereby said resilient strips obviate the necessity of providing additional resilient means between said tines and said beam.

6. A side delivery hay raking vehicle of the character described having a chassis, a plurality of tines each mounted on said chassis in a line extending in echelon with respect to the direction of forward movement of said vehicle, each of said tines having a compound curvature and lying generally on a continuous spiral and having the lower extremity thereof making an acute angle with the plane of the ground and spaced immediately above the ground to rake hay which lies on the ground, a beam supported on said chassis and extending generally in a direction parallel to the aforementioned line, a plurality of rake bars each having its lower end supporting a corresponding tine, and a plurality of resilient strips each having one of its ends attached to a corresponding rake bar and the other one of its ends connected directly on said beam, said resilient strips providing substantially all of the resilience of the mounting of the tines on said beam, said rake bars having an intermediate portion thereof disposed rearwardly of the lower extremity of the corresponding tine and contacting the ground with a relatively large contact area to prevent said lower extremities of said tines from digging into the ground.

7. In a side delivery hay raking device of the character described for mounting on a tractor, a supporting frame, a plurality of individually spaced tines mounted on said frame in a line extending at an angle in the direction of movement of said device, each one of said tines having a compound curvature lying generally on a continuous spiral and having each lower extremity thereof making an acute angle with the plane of the ground and spaced immediately above the ground to rake hay which lies on the ground, said frame including three pivot points lying in a nonvertical plane at the forward end of the same for pivotal movement on the ends of corresponding ones of three arms on said tractor intended to support and move said frame, a support beam on said frame supporting each of said tines and extending in a direction generally parallel with the aforementioned line, each of said three pivot points being defined by means on the frame adapting the same to be attached to corresponding ones of said three arms of said tractor for supporting the frame on said tractor about a pair of parallel pivoting axes which pass through said pivot points, said means defining a first one of said pivot points located on an upper part of said frame at a position above and rearwardly of the other two pivot points, said means also defining the other two of said pivot points located on a lower part of the frame at positions below and forwardly of said one pivot point with one of said parallel axes extending through said one pivot point and the other one of said parallel axes extending through said other two of said pivot points.

8. In a side delivery hay raking device of the character described for mounting on a tractor, a supporting frame, and a plurality of individually spaced tines mounted on said frame in a line extending at an angle to the direction of movement of said device, each one of said tines having a compound curvature lying generally on a continuous spiral and having the lower extremity thereof making an acute angle with the plane of the ground and spaced immediately above the ground to rake hay which lies on the ground, said supporting frame having a three point suspension system adapting the same for mounting on said tractor, a plurality of rake bars, each supporting a corresponding tine on said frame, each rake bar having an intermediate portion thereof disposed rearwardly of the lower extremity of the corresponding tine and provided with a relatively large ground contacting surface to prevent said lower extremities of said tines from digging into the ground, said suspension system including pivotal supporting means on said frame that lie in a non-vertical plane.

9. In a side delivery hay raking device of the character described for mounting on a tractor having a pair of spaced parallel and equally extending supporting arms and a lift arm which is between said parallel supporting arms, a supporting frame, and a plurality of individually spaced tines mounted on said frame in a line extending at an angle to the direction of movement of said device, each one of said tines having a compound curvature lying generally on a continuous spiral and having the lower extremity thereof making an acute angle with the plane of the ground and spaced immediately above the ground to rake hay which lies on the ground, said supporting frame having a three point parallelogram suspension system adapting the same for mounting on said tractor, a self-propelled wheel rotatably mounted on said frame with the rotational axis thereof inclined with respect to the direction of movement of said device, means rotatably supporting said wheel of said frame such that said wheel rotates in a vertically inclined plane with the lower peripheral portion of the wheel being forward of its upper peripheral portion and with the rotative axis of the wheel inclined with respect to said direction of movement, said wheel having said lower peripheral portion thereof disposed in front of the leading tine and overlying the lower extremity of the same to engage and crowd hay in the direction of said tines, a plurality of rake bars each supporting a corresponding tine and having a relatively large ground contacting surface disposed rearwardly of the extremity of the corresponding tine to prevent the extremities of said tines from digging into the ground, said parallelogram suspension system including first means on said frame for pivotal attachment to the free ends of said parallel arms, and second means on said frame located rearwardly and above said first means for pivotal attachment to said lift arm so that said tines and wheel may at all times be supported equal distances above the ground.

10. An arrangement as set forth in claim 9 including a plurality of resilient straps each having one of its ends connected to one end of a corresponding rake bar and the other one of its ends connected directly on said supporting frame and providing substantially all of the resiliency between said frame and the corresponding tine.

11. A device as set forth in claim 1 in which a ground-engaging gauge wheel is rotatably supported on said frame.

12. In an arrangement of the character described wherein a side delivery hayraking device is mounted on a frame that is pulled by a tractor the improvement which recites in rotatably supporting a self-propelled ground engaging wheel on said frame such that said wheel rotates in a vertically inclined plane with the lower peripheral portion of the wheel being forward of its upper peripheral portion and with the rotative axis of the wheel inclined with respect to the direction of movement of said frame, and in which the lower peripheral portions of said wheel overlies the leading tine of said side delivery hayraking device so that said wheel is self-propelled and moves hay in the direction of the tines.

13. The improvement set forth in claim 12 in which a stripper bar is mounted on said frame and side portions thereof extending in the direction of said tines and along and in front of said lower peripheral portion of said wheel to strip hay from said wheel, said stripper bar portion extending generally parallel to the line of tines on said rake for guiding hay in the direction of said tines and for stripping hay from the lower peripheral portion of said wheel.

14. A side delivery rake comprising an elongate support having a leading end and a trailing end, means on said support for moving it in an oblique direction, a plurality of rake teeth arranged along said support, and a raking wheel operatively associated with said support in front of said leading end for raking hay inwardly and from the path of said leading end, the hay raked by said wheel being delivered to rake teeth rearwardly of the leading end.

15. A side delivery rake as recited in claim 14 wherein said rake wheel is rotatable in a plane substantially parallel to the extension of said elongate support.

16. A side delivery rake as recited in claim 15 wherein said rake teeth have arcuate portions which extend in planes generally parallel to said oblique direction in which said support is adapted to move, and said rake wheel having rearwardly deflectable rake fingers, the disposition of said rake wheel being such relative to said support that the rake fingers on the wheel are maintained clear of engagement with the rake teeth on said support when said fingers are deflected.

17. A side delivery rake comprising, an elongate support, having a leading end and a trailing end, means on said support for moving it in an oblique direction, a plurality of rake teeth arranged along said support and a raking wheel operatively associated with said support near said leading end for raking hay inwardly from the path of said leading end, the hay raked by said wheel being delivered to rake teeth rearwardly of the leading end.

18. A side delivery rake as recited in claim 17 wherein said rake teeth have arcuate portions which extend in planes generally parallel to said oblique direction in which said support is adapted to move, and said rake wheel having rearwardly deflectable rake fingers, the disposition of said rake wheel being such relative to said support that the rake fingers on the wheel are maintained clear of engagement with the rake teeth on said support when said fingers are deflected.

References Cited in the file of this patent

UNITED STATES PATENTS

| | | |
|---|---|---|
| 541,169 | Kimball | June 18, 1895 |
| 743,720 | Henning | Nov. 10, 1903 |
| 2,049,868 | Roessel | Aug. 4, 1936 |
| 2,459,961 | Pollard | Jan. 25, 1949 |
| 2,667,730 | McCall et al. | Feb. 2, 1954 |
| 2,687,608 | McClellan | Aug. 31, 1954 |
| 2,744,377 | McCall et al. | May 8, 1956 |
| 2,829,486 | Skromme et al. | Apr. 8, 1958 |

FOREIGN PATENTS

| | | |
|---|---|---|
| 20,849 | Great Britain | Nov. 5, 1895 |